United States Patent
Adachi (10) Patent No.: US 10,819,867 B2
(45) Date of Patent: Oct. 27, 2020

(54) SOUND NOTIFICATION DEVICE AND METHOD FOR MULTIFUNCTIONAL PERIPHERAL DEVICE FOR OUTPUTTING SOUND RELATED TO POSTPROCESSING

(71) Applicant: SHARP KABUSHIKI KAISHA, Sakai, Osaka (JP)

(72) Inventor: Etsuzo Adachi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/157,078

(22) Filed: Oct. 10, 2018

(65) Prior Publication Data
US 2019/0109955 A1 Apr. 11, 2019

(30) Foreign Application Priority Data

Oct. 10, 2017 (JP) ................................. 2017-196996

(51) Int. Cl.
| | |
|---|---|
| *H04N 1/00* | (2006.01) |
| *G06F 3/16* | (2006.01) |
| *H04R 1/40* | (2006.01) |
| *H04R 3/12* | (2006.01) |
| *H04R 1/02* | (2006.01) |

(52) U.S. Cl.
CPC ......... *H04N 1/00488* (2013.01); *G06F 3/165* (2013.01); *H04R 1/028* (2013.01); *H04R 1/403* (2013.01); *H04R 3/12* (2013.01); *H04N 2201/0094* (2013.01); *H04R 2430/01* (2013.01)

(58) Field of Classification Search
None
See application file for complete search history.

(56) References Cited

U.S. PATENT DOCUMENTS

| | | | |
|---|---|---|---|
| 6,445,802 B1 * | 9/2002 | Dan ........................ | H04R 5/02 379/418 |
| 2006/0085185 A1 * | 4/2006 | Watanabe ............... | G10L 15/26 704/235 |
| 2006/0197277 A1 * | 9/2006 | Yamashita ............... | B65H 1/14 271/126 |
| 2009/0196635 A1 * | 8/2009 | Morita .................. | B65H 29/008 399/21 |
| 2014/0119550 A1 * | 5/2014 | Ashcraft .................. | G06F 3/167 381/59 |
| 2018/0262648 A1 * | 9/2018 | Ravel .................. | H04N 1/00477 |

FOREIGN PATENT DOCUMENTS

JP  2011-180481  9/2011

* cited by examiner

*Primary Examiner* — Thomas D Lee
(74) *Attorney, Agent, or Firm* — ScienBiziP, P.C.

(57) ABSTRACT

A sound notification device includes a plurality of speakers of each of which a sound volume is capable of being adjusted and which have directivity characteristics different from each other; and a speaker control unit which selects at least one speaker of the plurality of speakers according to a content of a predetermined event and causes the selected speaker to output a sound with a sound volume determined according to the content of the event if the event occurs in a device.

15 Claims, 7 Drawing Sheets

| FUNCTION | EVENT | SOUND CONTENT |
|---|---|---|
| COPY | COPY IS NORMALLY COMPLETED | SIGNAL SOUND #1 |
| | COPY/POST-PROCESSING IS NORMALLY COMPLETED | SIGNAL SOUND #2 |
| | PAPER JAM (FIRST NOTIFICATION) | SIGNAL SOUND #3 |
| | PAPER JAM (SECOND NOTIFICATION) | SIGNAL SOUND #4 |
| SCAN | SCAN IS NORMALLY COMPLETED | SIGNAL SOUND #5 |
| PRINT | PRINT IS NORMALLY COMPLETED | SIGNAL SOUND #6 |
| | ENTIRE PAPER JAM | SIGNAL SOUND #7 |
| FAX RECEPTION | FAX RECEPTION/PRINT IS NORMALLY COMPLETED (SPECIFIC ADDRESS INFORMATION) | SIGNAL SOUND #8 |
| | FAX RECEPTION/PRINT IS NORMALLY COMPLETED (NON-REGISTRATION ADDRESS INFORMATION) | SIGNAL SOUND #9 |

SOUND NOTIFICATION DEVICE AND METHOD FOR MULTIFUNCTIONAL PERIPHERAL DEVICE FOR OUTPUTTING SOUND RELATED TO POSTPROCESSING

BACKGROUND

1. Field

The present disclosure relates to a sound notification device, a multifunction peripheral, a sound notification method, and a notification program for performing sound notification with directivity characteristics according to a situation of a device and a distance between the device and a user.

2. Description of the Related Art

It is known that a beep sound or the like is output from a single speaker mounted on a multifunction peripheral to notify a user when a job such as printing is completed or a trouble such as the paper jam occurs in the multifunction peripheral.

Japanese Unexamined Patent Application Publication No. 2011-180481 (published on Sep. 15, 2011) discloses that a distance between a user and a sound output unit is detected by a human detection sensor, and an output sound volume of the sound output unit is controlled according to the detected distance.

Meanwhile, jobs of the multifunction peripheral are various types such as printing, copying, transmission and reception of facsimile (hereinafter, referred to as "FAX"), scanner reading (hereinafter, referred to as "scanning"), and staple processing. In the jobs, behavior patterns of the user are different from each other. For example, in a case of printing, the user instructs printing execution from a personal computer of his/her seat or the like, and then walks to the multifunction peripheral to take a printed matter. In a case of copying, the user walks to the multifunction peripheral, sets a document on the multifunction peripheral to copy the document, and returns to his/her seat with the document and a copied document. In addition, in a case of transmission of FAX, the user walks to the multifunction peripheral, sets the document on the multifunction peripheral to transmit the FAX, and returns to his/her seat with the document. In addition, in a case of reception of FAX, the user walks to the multifunction peripheral, outputs paper of a FAX document received by the multifunction peripheral, and returns to his/her seat with the document. In addition, in a case of scanning, the user walks to the multifunction peripheral, sets the document, to read the document, and returns to his/her seat with the document.

In each of the jobs described above, the user walks to the multifunction peripheral, performs an instruction to the multifunction peripheral, and stays in front of or near the multifunction peripheral until the multifunction peripheral completes the job. Meanwhile, in such a case, most of the job time is short.

However, in a case of printing a large amount, copying a large amount using a sort function, or performing transmission and reception of FAX of a large amount, most users generally wait away from the multifunction peripheral such as returning to their seats or going to other places.

In the case, when the job is completed or some trouble occurs, in a case where the beep sound or the like is sounded at a sustained sound volume and notified, the following problems occur.

If the job completion or occurrence of abnormality is notified with a sustained small notification sound, when a person using the multifunction peripheral moves to a place far away from the multifunction peripheral before the job is completed by the person, the notification sound may not reach the person.

On the other hand, if the job completion or occurrence of abnormality is notified with a sustained large notification sound, a person who does not use the multifunction peripheral listens to the sound which is unrelated to the person. If this is an office, the business may be hindered by lowering concentration or the like.

SUMMARY

It is desirable to provide a sound notification device, a multifunction peripheral, a sound notification method, and a sound notification program capable of allowing a sound notification to reach a person who is a demanded notification destination but not to reach a person who is not the demanded notification destination.

According to an aspect of the present disclosure, there is provided a sound notification device including a plurality of speakers of each of which a sound volume is capable of being adjusted and which have directivity characteristics different from each other; and a speaker control unit which selects at least one speaker of the plurality of speakers according to a content of a predetermined event and causes the selected speaker to output a sound with a sound volume determined according to the content of the event if the event occurs in a device.

According to still another aspect of the present disclosure, there is provided a sound notification method of casing a plurality of speakers of each of which a sound volume is capable of being adjusted and which have directivity characteristics different from each other, to each output a sound, the method including: selecting at least one speaker of the plurality of speakers according to a content of a predetermined event and causing the selected speaker to output a sound with a sound volume determined according to the content of the event if the event occurs in a device.

DESCRIPTION OF THE EMBODIMENTS

Hereinafter, embodiments of the present disclosure will be described in detail with reference to the drawings.

First Embodiment

Figure 1:
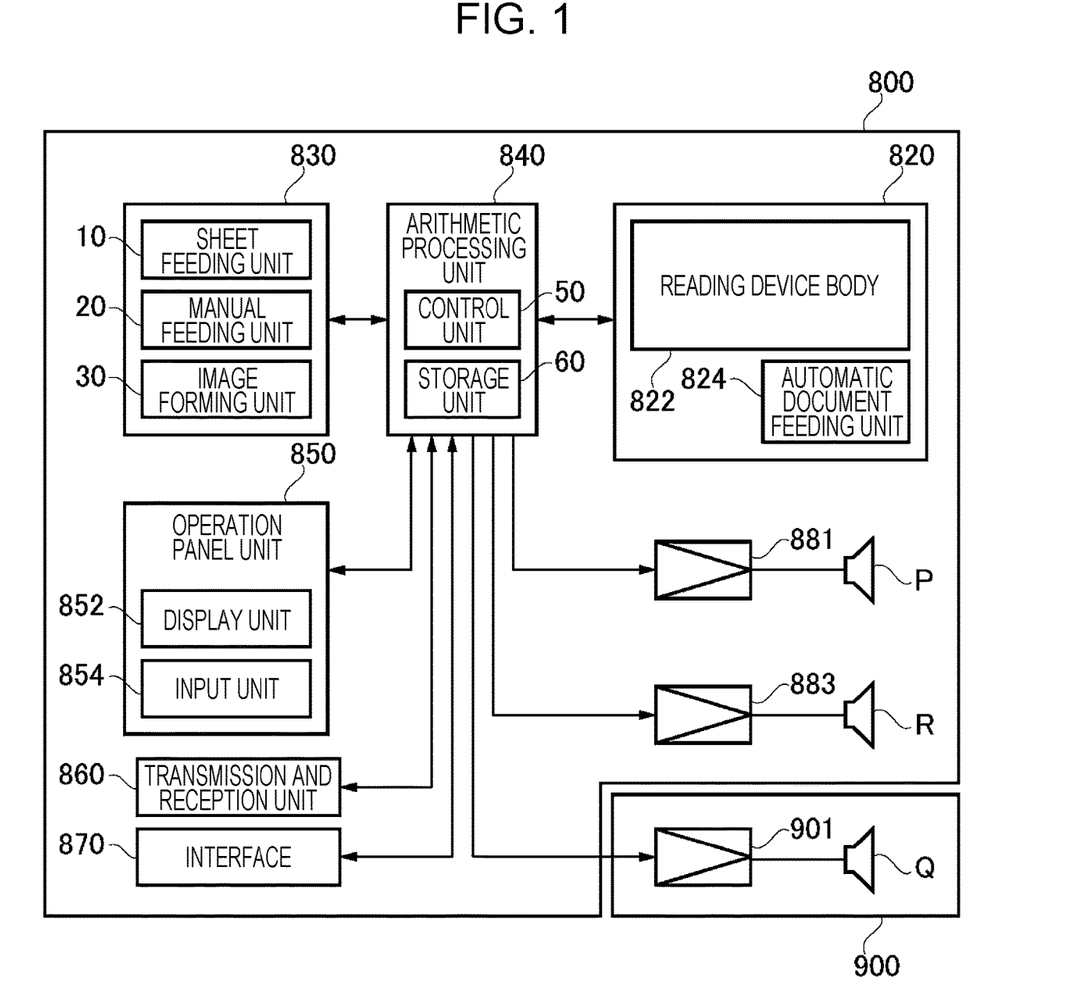
FIG. 1 is a functional block diagram of a multifunction peripheral and a finisher according to a first embodiment of the present disclosure.
Figure 2:
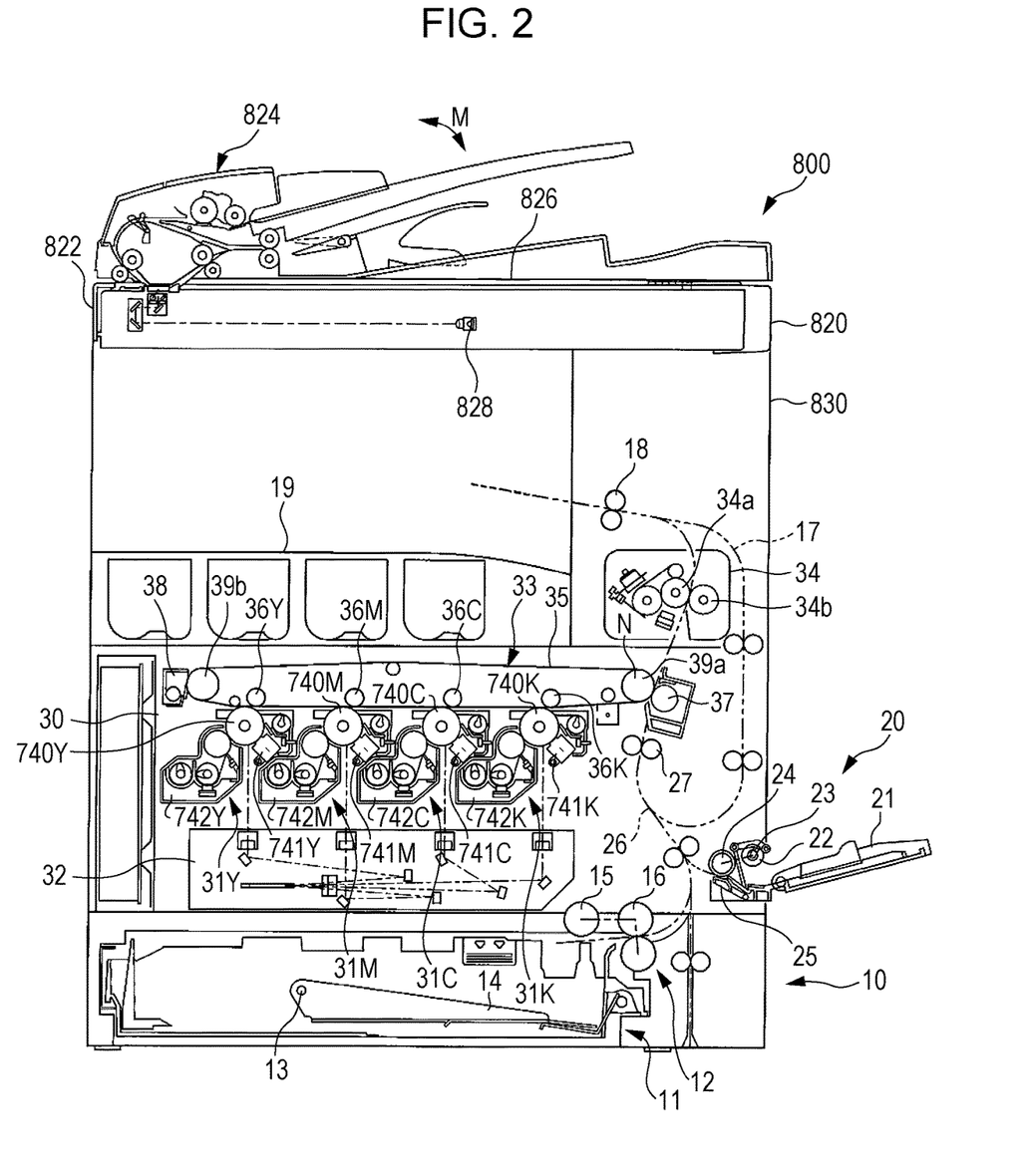
FIG. 2 is a conceptual sectional view of the multifunction peripheral according to the first embodiment of the present disclosure.

A first embodiment relates to a multifunction peripheral 800 and a finisher 900 including notification devices according to second to seventh embodiments. FIGS. 1 and 2 illustrate configurations of the multifunction peripheral 800 and the finisher 900.

As illustrated in FIGS. 1 and 2, the multifunction peripheral 800 includes a document reading device 820 that reads an image of a document, a multifunction peripheral body (image forming unit body) 830 which forms an image on a sheet, an operation panel unit 850 that operates the document reading device 820 and the multifunction peripheral body 830, an arithmetic processing unit 840 that controls the document reading device 820 and the multifunction peripheral body 830 based on an operation by the operation panel unit 850, a transmission and reception unit 860 that performs transmission and reception of image information via various public lines, and an interface 870 for performing wired or wireless connection with a server or the like.

The operation panel unit 850 is a touch panel display which includes a display unit 852 and an input unit 854, and on which various kinds of information and buttons according to modes of the multifunction peripheral 800 are displayed.

The transmission and reception unit 860 can transmit an image read by the document reading device 820 and an image stored in a storage device, and can receive an image from an outside.

The document reading device 820 includes an automatic document feeding unit (SPF: Single Pass Feeder) 824 that automatically feeds the document and a reading device body 822 that reads an image of the document. Moreover, in addition to the configuration elements illustrated in FIG. 1, the document reading device 820 also includes configuration elements illustrated in FIG. 2, which are not illustrated in FIG. 1. In addition, as illustrated in FIGS. 1 and 2, the reading device body 822 is provided with a document stand 826.

The multifunction peripheral body 830 includes a sheet feeding unit 10 that feeds a sheet, a manual feeding unit 20 capable of manually feeding the sheet, and an image forming unit 30 that forms an image on the sheet fed by the sheet feeding unit 10 or the manual feeding unit 20.

The sheet feeding unit 10 includes a sheet stacking unit 11 for stacking sheets and a separating and feeding unit 12 that separates and feeds the sheets stacked on the sheet stacking unit 11 one by one. The sheet stacking unit 11 includes an intermediate plate 14 that rotates around a rotation shaft 13 and the intermediate plate 14 rotates to lift the sheet upward when the sheet is fed. The separating and feeding unit 12 includes a pickup roller 15 that feeds the sheet lifted by the intermediate plate 14 and a separation roller pair 16 that separates the sheets fed by the pickup roller 15 one by one.

The manual feeding unit 20 includes a manual feeding tray 21 that is capable of stacking the sheets and a separating and feeding unit 22 that separates and feeds the sheets stacked on the manual feeding tray 21 one by one. The manual feeding tray 21 is rotatably supported by the multifunction peripheral body 830 and is fixed at a predetermined angle when the sheet is manually fed so that the sheets can be stacked thereon. The separating and feeding unit 22 includes a pickup roller 23 that feeds the sheet stacked on the manual feeding tray 21 and a separation roller 24 and a separation pad 25 for separating the sheets fed by the pickup roller 23 one by one.

The image forming unit 30 includes four process cartridges 31Y to 31K for forming images of yellow (Y), magenta (M), cyan (C), and black (K), photosensitive drums 740Y to 740K which are described later, an exposing device 32 for exposing surfaces thereof, a transfer unit (transfer device) 33 that transfers toner images formed on the surfaces of the photosensitive drums 740Y to 740K onto the sheet, and a fixing unit 34 that fixes the transferred toner image to the sheet. Moreover, alphabets (Y, M, C, and K) added to an end of a code indicate respective colors (yellow, magenta, cyan, and black).

Each of the four process cartridges 31Y to 31K can be detached from the multifunction peripheral body 830 and is exchangeable. Moreover, the four process cartridges 31Y to 31K has the same configuration except that the colors of the images to be formed are different, so that only a configuration of the process cartridge 31Y for forming the image of yellow (Y) is described and descriptions of the process cartridges 31M to 31K will be omitted.

The process cartridge 31Y includes the photosensitive drum 740Y as an image carrier, a charger 741Y for charging the photosensitive drum 740Y, a developing device 742Y for developing an electrostatic latent image formed on the photosensitive drum 740Y, and a drum cleaner for removing toner remaining on the surface of the photosensitive drum 740Y. The developing device 742Y includes a developing device body (not illustrated in detail) for developing the photosensitive drum 740Y and a toner cartridge (not illustrated in detail) for supplying the toner to the developing device body. The toner cartridge is configured to be attachable and detachable to and from the developing device body and can be detached from the developing device body and exchanged when the stored toner is exhausted.

The exposing device 32 includes a light source (not illustrated) for irradiating the photosensitive drums 740Y to 740K with a laser beam, a plurality of mirrors (not illustrated) for guiding the laser beam to the photosensitive drums 740Y to 740K, and the like. The transfer unit 33 includes an intermediate transfer belt 35 that carries the toner images formed on the photosensitive drums 740Y to 740K, primary transfer rollers 36Y to 36K that primarily transfer the toner images formed on the photosensitive drums 740Y to 740K to the intermediate transfer belt 35, a secondary transfer roller 37 that secondarily transfers the toner image, which is transferred to the intermediate transfer belt 35, to the sheet, and a belt cleaner 38 for removing the toner remaining on the intermediate transfer belt 35. The intermediate transfer belt 35 is wound around a driving roller 39a and a driven roller 39b and is pressed against the photosensitive drums 740Y to 740K by the primary transfer rollers 36Y to 36K. The secondary transfer roller 37 nips (pinches) the intermediate transfer belt 35 with the driving roller 39a and transfers the toner image carried by the intermediate transfer belt 35 to the sheet at a nip portion N. The fixing unit 34 includes a heating roller 34a and a pressure roller 34b pressed against the heating roller 34a.

The operation panel unit 850 includes the display unit 852 that displays predetermined information and the input unit 854 for a user to input an instruction to the document reading device 820 and the multifunction peripheral body 830. In the embodiment, the operation panel unit 850 is disposed on a front side of the reading device body 822. Moreover, the front side corresponds to a front side of a page of FIG. 2 and a back side corresponds to a back side of that of FIG. 2.

As illustrated in FIGS. 1 and 2, the arithmetic processing unit 840 includes a control unit 50 that controls driving of the sheet feeding unit 10, the manual feeding unit 20, the image forming unit 30, and the document reading device 820, and a storage unit 60 that stores various programs for operating the control unit 50, various kinds of information used by the control unit 50, and the like. The storage unit 60 can store an image read by the document reading device 820 and an image received by the transmission and reception unit 860. The arithmetic processing unit 840 integrates and controls operations of the sheet feeding unit 10, the manual feeding unit 20, the image forming unit 30, and the document reading device 820 based on an operation to the operation panel unit 850 by the user, and forms an image on the sheet.

The finisher 900 can perform processing such as staple processing and perforation processing.

In addition to the configuration elements described above, the multifunction peripheral 800 includes sound amplifiers 881 and 883, and speakers P and R which are respectively driven thereby. The finisher 900 includes a sound amplifier 901 and a speaker Q which is driven thereby.

The speaker P has a unidirectional property directed toward a vicinity of the front as directivity characteristics and the speaker R has no directional property (also referred to having no directivity as an omnidirectional property) as the directivity characteristics. The speaker Q has a unidirectional property directed toward the vicinity of the front as the directivity characteristics.

The arithmetic processing unit 840 determines a speaker and a sound volume to output the sound, and outputs a sound signal according to the sound volume to any of the sound amplifiers 881, 883, and 901 which is selected accordingly.

Next, an image forming operation (image forming control by the arithmetic processing unit 840) by the multifunction peripheral 800 configured as described above will be described. In the embodiment, an image forming operation, in which the image forming unit 30 forms an image of a read document fed by the automatic document feeding unit 824 and read by the reading device body 822 on a sheet fed by the sheet feeding unit 10, will be described as an example.

When an image forming start signal is transmitted by an input to the input unit 854 of the operation panel unit 850 by the user, the read document placed on the automatic document feeding unit 824 by the user is automatically fed toward a document reading position, and the image is read by the reading device body 822 at the document reading position.

When the image of the document is read by the reading device body 822, the exposing device 32 irradiates the photosensitive drums 740Y to 740K with a plurality of laser beams corresponding to thereto based on image information of the read document. In this case, each of the photosensitive drums 740Y to 740K is charged by each of the chargers 741Y to 741K, and is irradiated with each of the laser beams corresponding thereto, so that respective electrostatic latent images are formed on the photosensitive drums 740Y to 740K. Thereafter, the electrostatic latent images respectively formed on the photosensitive drums 740Y to 740K are developed by the developing devices 742Y to 742K, and the toner images of yellow (Y), magenta (M), cyan (C), and black (K) are formed on the photosensitive drums 740Y to 740K. The toner images of each color formed on the photosensitive drums 740Y to 740K are superposed and transferred to the intermediate transfer belt 35 by the primary transfer rollers 36Y to 36K, and the superposed and transferred toner image (full-color toner images) is transported to the nip portion N in a state of being carried by the intermediate transfer belt 35.

In parallel to the image forming operation described above, the sheets stacked by the sheet stacking unit 11 are fed to a sheet transporting path 26 by the pickup roller 15 while being separated by the separating and feeding unit 12 one by one. Skew feeding is corrected by a registration roller pair 27 on an upstream side of the nip portion N in a sheet transporting direction and the sheet is transported to the nip portion N at a predetermined transporting timing. The full-color toner image carried by the intermediate transfer belt 35 is transferred by the secondary transfer roller 37 on the sheet transported to the nip portion N.

The sheet on which the toner image is transferred is heated and pressed by the fixing unit 34, so that the toner image is fused and fixed, and is discharged to the outside of the device by a discharge roller pair 18. The sheet discharged to the outside of the device is stacked on a discharged sheet stacking unit 19.

Moreover, in a case where images are formed on both sides (first surface and second surface) of the sheet, before the sheet where an image is formed on the first surface is discharged to the outside of the device, the sheet is transported to a duplex transporting path 17 by reversely rotating the discharge roller pair 18, and is transported again to the image forming unit 30 via the duplex transporting path 17. Similar to the first surface, an image is formed on the second surface and the sheet is discharged to the outside of the device. The sheet discharged to the outside of the device is stacked on the discharged sheet stacking unit 19.

Next, a concept of a range of the sound notification by the speaker P having the unidirectional property, the speaker R having the non-directional property which are provided in the multifunction peripheral 800, and the speaker Q having the unidirectional property which is provided in the finisher 900 described with reference to FIGS. 1 and 2 will be described with reference to FIGS. 3 and 4.

Figure 3:
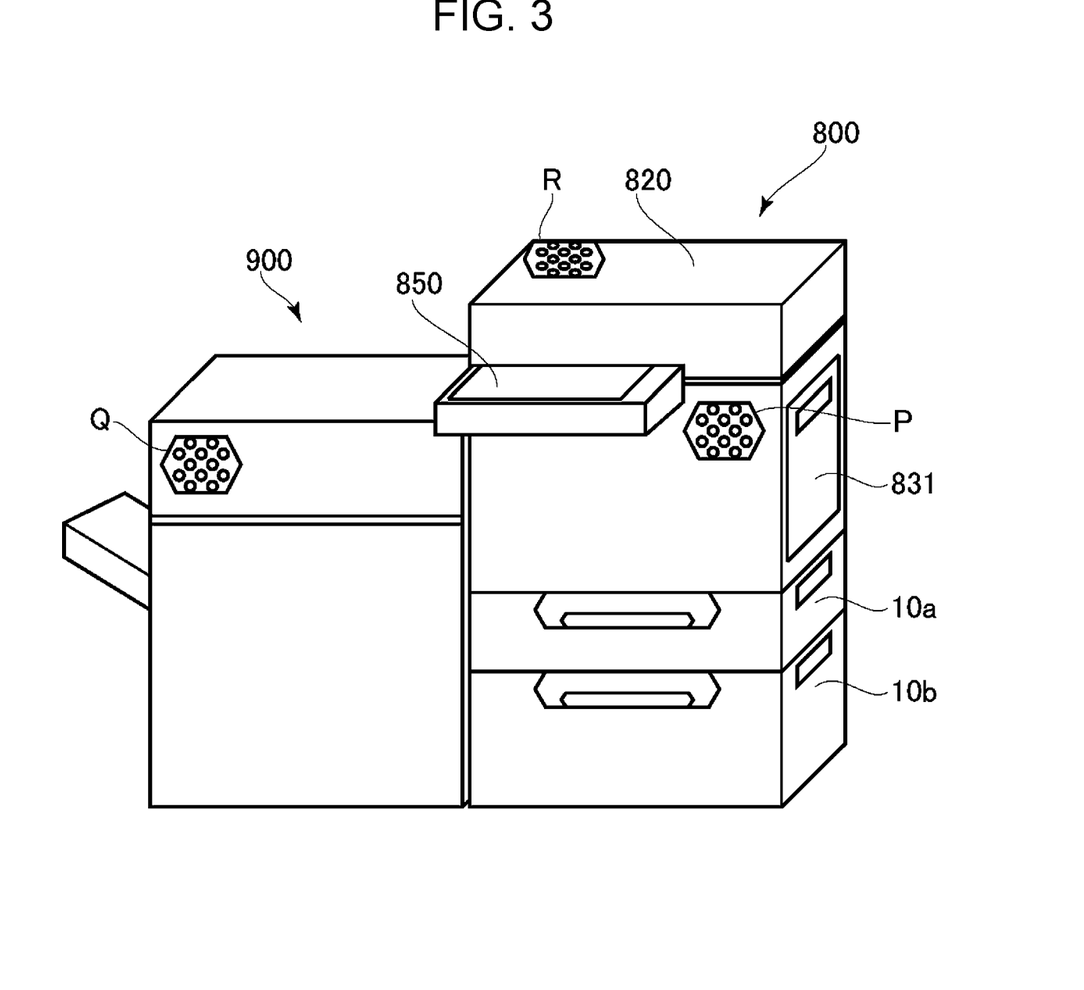
FIG. 3 is a perspective view illustrating an example of the multifunction peripheral and the finisher according to the first embodiment of the present disclosure.

As illustrated in FIG. 3, the multifunction peripheral 800 includes a part 831 of a sheet passing unit which opens in a case where the paper jam occurs or the like, and sheet feeding units 10a and 10b on a right side surface. The speaker R having the non-directional property is mounted on the document reading device 820 of the multifunction peripheral 800 and the speaker P having the unidirectional property is mounted on a right upper portion of the front side. The speaker Q having the unidirectional property is mounted on a left upper portion of the front side of the finisher 900.

Hereinafter, although a combination of the arrangement and the directivity characteristics will be described as a premise, the combination of the attachment positions of respective speakers P, R, and Q, and the directivity characteristics of the respective speakers P, R, and Q with respect to the attachment positions is not limited thereto.

Figure 4:
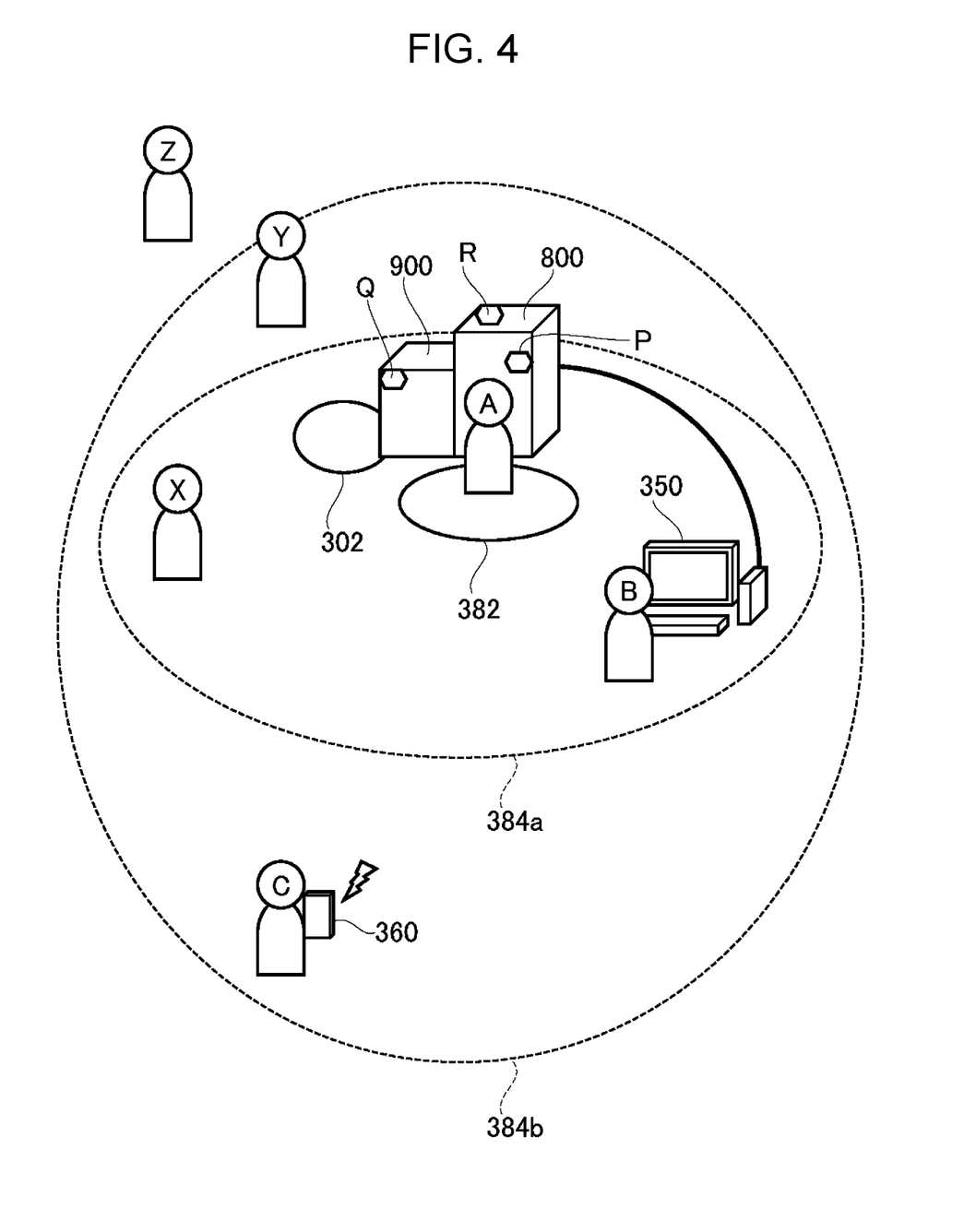
FIG. 4 is an explanatory view illustrating an example of a notification by using a speaker having a unidirectional property and a speaker having the non-directional property according to the first embodiment of the present disclosure.

FIG. 4 is a conceptual view for explaining the directivity characteristics and a sound reaching range by the speakers P and Q having the unidirectional property and the speaker R having the non-directional property.

In FIG. 4, a sound reaching range 302 indicated by a solid line indicates a sound reaching range by the speaker Q having the unidirectional property mounted on the finisher 900, a sound reaching range 382 indicated by a solid line indicates a sound reaching range by the speaker P mounted on the multifunction peripheral 800. As indicated by each of the sound reaching ranges 302 and 382, the speakers P and Q have the unidirectional property, so that the sound can be output with a large sound volume with respect to a directivity range, on the other hand, there is a characteristic that the sound is hard to reach an outside of the directivity range.

A sound reaching range 384a indicated by a broken line indicates a sound reaching range in a case where a sound is output from the speaker R having the non-directional property mounted on the multifunction peripheral 800, for example, with a volume of ½ of a maximum volume, and a sound reaching range 384b indicated by a broken line indicates a sound reaching range in a case where a sound is output from the speaker R having the non-directional property mounted on the multifunction peripheral 800, for example, with the maximum volume. As indicated by each of the sound reaching ranges 384a and 384b, the speaker R has no directional property, so that the sound reaching range is substantially sustained irrespective of an azimuth. Therefore, the multifunction peripheral 800 has characteristics that the sound can be output with a sustained sound volume with respect to an entire periphery of the multifunction peripheral 800 by the speaker R.

A personal computer 350 is connected to the multifunction peripheral 800 and a server (not illustrated) via the interface 870 illustrated in FIG. 1 and a LAN, and exists in the sound reaching range 384a.

A mobile terminal 360 and the multifunction peripheral 800 are connected via an IP network. The IP network is formed across a LAN, a WAN, and a mobile phone network. The mobile terminal 360 exists in the sound reaching range 384b but does not exist in the sound reaching range 384a where a distance from the multifunction peripheral 800 is shorter than the sound reaching range 384b. The mobile terminal 360 and the multifunction peripheral 800 may be connected by a local communication network (including a local wireless communication network).

Next, in the multifunction peripheral 800 and the finisher 900, functions of copy, scan, print, FAX reception, and the like, and selection of an output speaker and the sound volume corresponding to the job completion and trouble occurrence in the functions will be described with reference to FIGS. 4 and 5.

For the speaker P, the speaker Q, and the speaker R, 0%, 50%, or a maximum volume 100% is set as each sound volume in a situation of the corresponding function. Moreover, here, a numerical value is not an absolute sound volume but the maximum sound volume of each speaker is taken as 100%. Therefore, if the numerical values are the same, the speaker of which the maximum sound volume is larger has a larger absolute sound volume. Specifically, since the absolute sound volume of the speaker R is larger than those of the speakers P and Q, if the numerical values are the same, the absolute sound volume of the speaker R is larger than those of the speakers P and Q. In addition, the values are simply an example and it goes without saying that the values are not limited thereto. In addition, a speaker control table 400 illustrated in FIG. 5 is stored in the storage unit 60 of the arithmetic processing unit 840 illustrated in FIG. 1.

In a case where the user performs a copy operation and the copy is normally completed, it is assumed that the user stands front the multifunction peripheral 800 and performs an operation. This can be said to be an operation of a user A in FIG. 4. In this case, as a speaker to output the sound, only the speaker P having the unidirectional property, which is mounted on the front surface of the multifunction peripheral 800, is used so as to output the sound within a range of the front surface of the multifunction peripheral 800. In this case, the sound volume of the speaker P is set to 100%, so that the sound remains within the range of the sound reaching range 382. Therefore, the sound does not reach a person who is not in a periphery, for example, a user X, so that it does not give annoyance to the person due to not demanded sound notification.

In addition, in a case where staple processing or the like is specified by the finisher 900 and copy is performed, in addition to the speaker P having the unidirectional property of the multifunction peripheral 800, the sound is also output from the speaker Q having the unidirectional property to the front surface of the finisher 900. This is because it is also assumed that the user is waiting in front of the finisher 900 in a case where the staple processing or the like is specified in the finisher 900.

In a case where the paper jam occurs in the copy, since it is assumed that the user is near the multifunction peripheral 800, at the beginning, the sound volume is set to 100% and notification is made by using the speakers P and Q. Even if the notification is given, if no measures are taken to cope with the notification for a predetermined time period, since there is a high possibility that the user is not near the multifunction peripheral 800, a second notification is made with a large sound volume of 100% by using the speaker R having the non-directional property.

In a case where the user performs a scan operation and the scan is normally completed, it is assumed that the user stands in front of the multifunction peripheral 800 and performs the operation. This can be said to be an operation of the user A in FIG. 4. In this case, as a speaker to output the sound, only the speaker P having the unidirectional property, which is mounted on the front surface of the multifunction peripheral 800, is used so as to output the sound within the range of the front surface of the multifunction peripheral 800. In this case, the sound volume of the speaker P is set to 100%, so that the sound remains within the range of the sound reaching range 382. Therefore, the sound does not reach a person who is not in a periphery, for example, the user X, so that it does not give annoyance to the person due to not demanded sound notification.

In the case of the copy described above, the user is near the multifunction peripheral 800, but in many cases of print, the user is sitting on a seat with a personal computer in front. Therefore, the case of the print, it is demanded to inform that the print is completed and the sound reaches the seat. In addition, normally, a position of the personal computer that issues a print command may not be detected. Therefore, instead of the speakers P and Q having the unidirectional property and the small maximum sound volume, the sound of print normal completion is output by using the speaker R having the non-directional property and the large maximum sound volume. Here, since it is not an occurrence of abnormality having importance to notify all, 50% is selected as an appropriate sound volume.

For example, in order to identify a user B, a transmission destination IP address in a header of an IP packet including the command can be used for the personal computer 350 of the user B, which transmits the print command to the multifunction peripheral 800. The position of the personal computer 350 can be specified by referring to a table holding a corresponding relationship between the IP address of each computer and the position thereof. A distance between the position of the computer and the position of the multifunction peripheral 800 can be obtained. The sound volume can be determined based on the distance. Therefore, the sound volume can be adjusted not only by the sound volume of 0%, 50%, and 100% described above but also by a step width of, for example, 10% based on the distance.

As a user C, in a case where the print operation is performed from the mobile terminal 360 but it is unknown where the user C having the mobile terminal 360 exists, in order to notify the sound to a wide range, the speaker R having the non-directional property and the large sound volume is used. The sound volume is set to 100% of the maximum value, so that the sound reaches the range of the sound reaching range 384b.

The fact that the user C uses the mobile terminal 360 may be determined by using a specific wireless system. In addition, a rough distance between the mobile terminal 360 and the multifunction peripheral 800 may be calculated based on a communication strength of wireless communication and may be reflected to sound output control. That is, the output sound volume of the speaker R may be adjusted according to the distance.

In a case where the paper jam occurs in the print, since it is assumed that the user is not near the multifunction peripheral 800 for the beginning, unlike a case where the paper jam occurs in the copy, from the beginning, the notification is made with the sound volume of 100% by using the speaker R having the non-directional property and the large sound volume. The sound reaches the range of the sound reaching range 384b. Therefore, not only the user who performs the print but also other persons can know that a serious trouble such as the paper jam occurs during the print.

When facsimile reception is performed by the multifunction peripheral 800, in a case where it is recognized from an address book, or the like that it is information from a specific address, for example, the facsimile reception from a customer, or the like, procedures are as follows. That is, as a speaker to output the sound, the speaker R having the non-directional property and the large sound volume, which is mounted on the upper surface of the multifunction peripheral 800, is used, and the sound volume is set to 100% of the maximum value, so that the sound reaches the range of the sound reaching range 384b. Therefore, all the users A, B, C, X, and Y who are in the sound reaching range 384b are reliably notified that a serious facsimile is received, taking of printed results is avoided from forgetting, and it is possible to response appropriately and promptly. Therefore, it is possible to know as many persons as possible the facsimile reception from the customer and to reduce as much as possible the fact that the received facsimile is left as it is without being noticed by anyone.

When facsimile reception is performed by the multifunction peripheral 800, in a case where it is recognized from the address book, or the like that it is not information from a specific address, for example, not the facsimile reception from the customer, or the like, as the speaker to output the sound, the speaker R having the non-directional property with no directivity and the large sound volume, which is mounted on the multifunction peripheral 800, is used. The sound volume is set to 50% of the maximum value so that the sound reaches the range of the sound reaching range 384a. Therefore, the minimum number of the users A, B, and X who are in the sound reaching range 384a are reliably notified that the facsimile is received, the sound does not reach the users C, Y, and Z who are in other range, and it does not give annoyance to the person due to not demanded sound notification. It is possible to avoid unnecessarily increasing the not demanded sound volume by not setting the address of the transmission destination of the facsimile, which does not have a serious problem for a while after being received, in a specific address.

Figure 5:
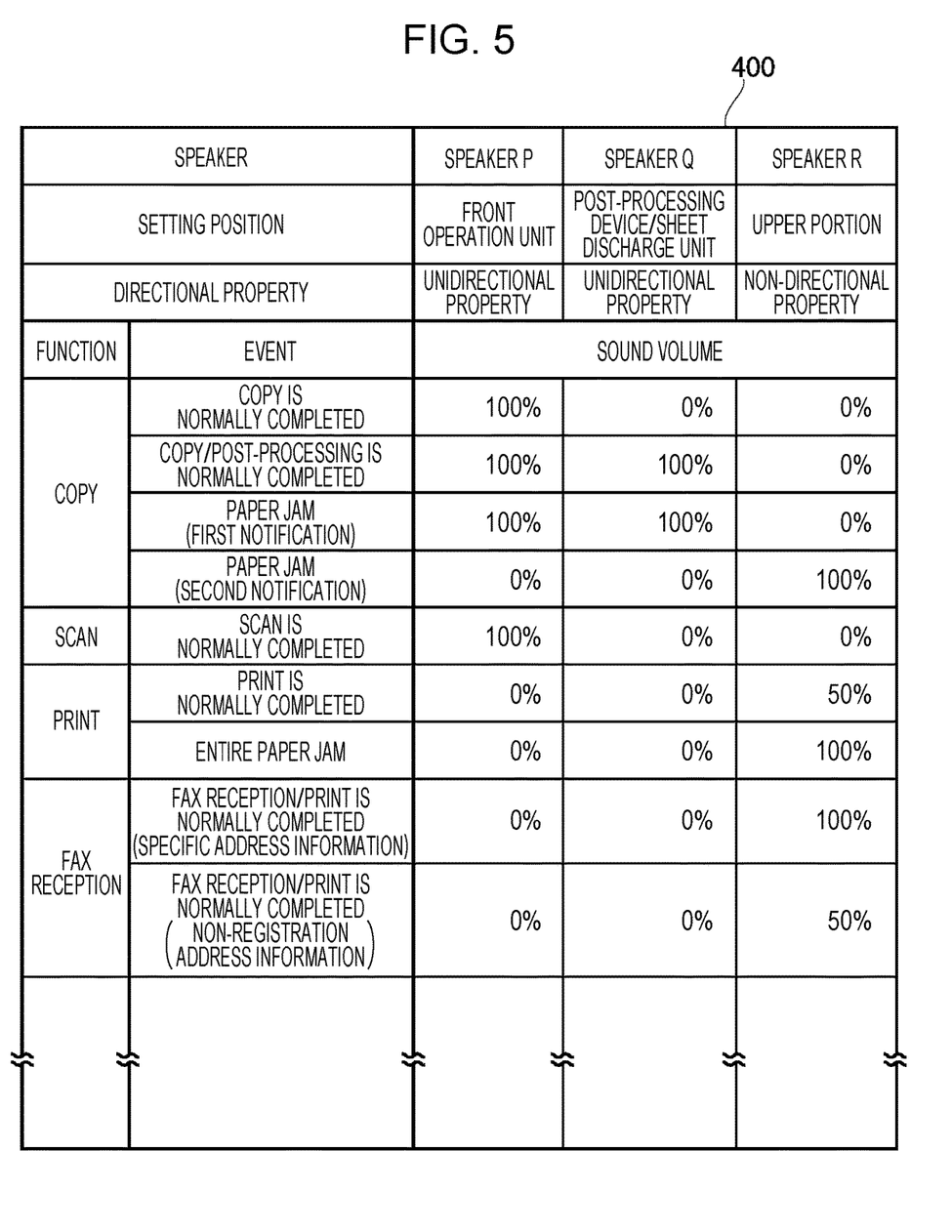
FIG. 5 is an explanatory view illustrating an example of a speaker control table according to the first embodiment of the present disclosure.
Figure 6:
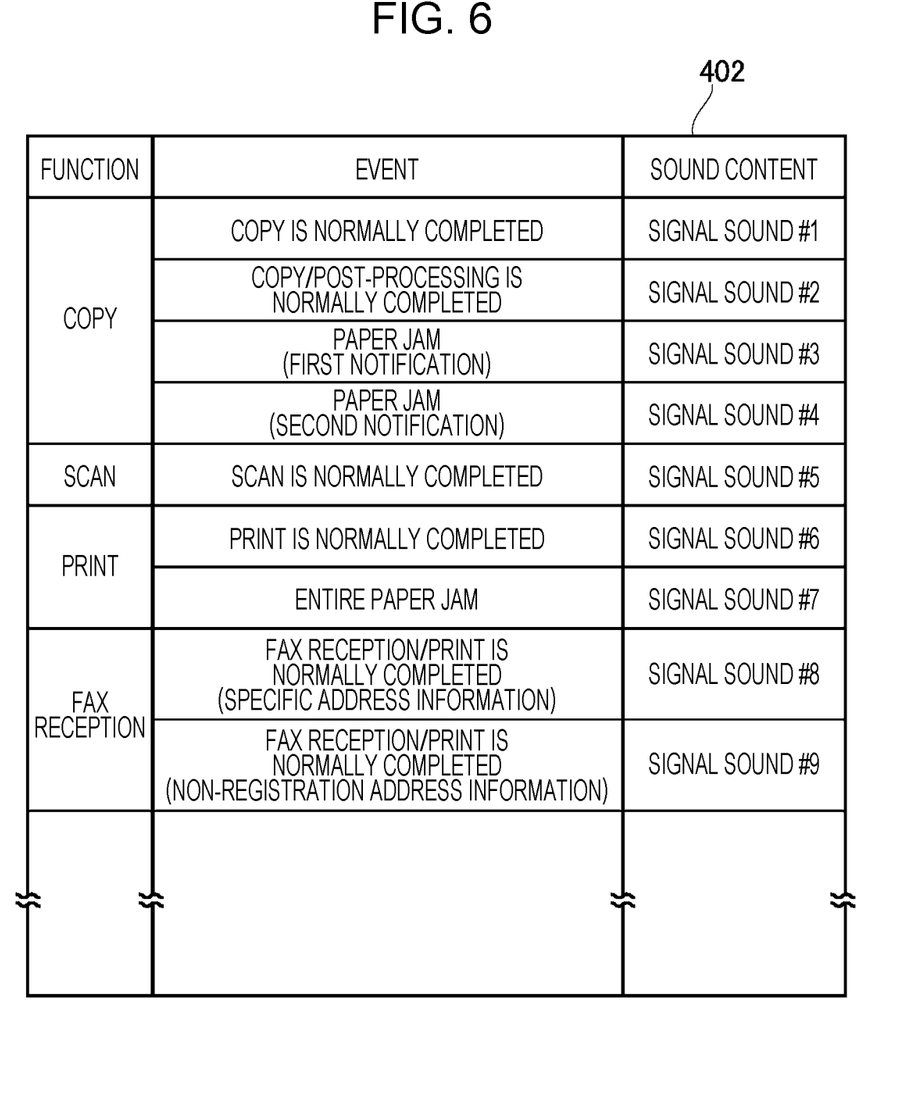
FIG. 6 is an explanatory view illustrating an example of a sound selection table according to the first embodiment of the present disclosure.

FIG. 6 illustrates a sound selection table 402. This illustrates a signal sound selected according to each set of the function and the event in the speaker control table 400 illustrated in FIG. 5. For example, if the copy is normally completed while the copy function is selected, a signal sound #1 is selected. This is output from the speaker P with the sound volume of 100%.

As signal sounds #1 to #9, preferably, one which can recognize the content of the event is selected. Some of the signal sounds may have the same content. The signal sound of the normal completion may be the same without distinction of functions or may be made different so that the functions can be known. The signal sound of the occurrence of the paper jam may be the same without distinction between related functions.

Figure 7:
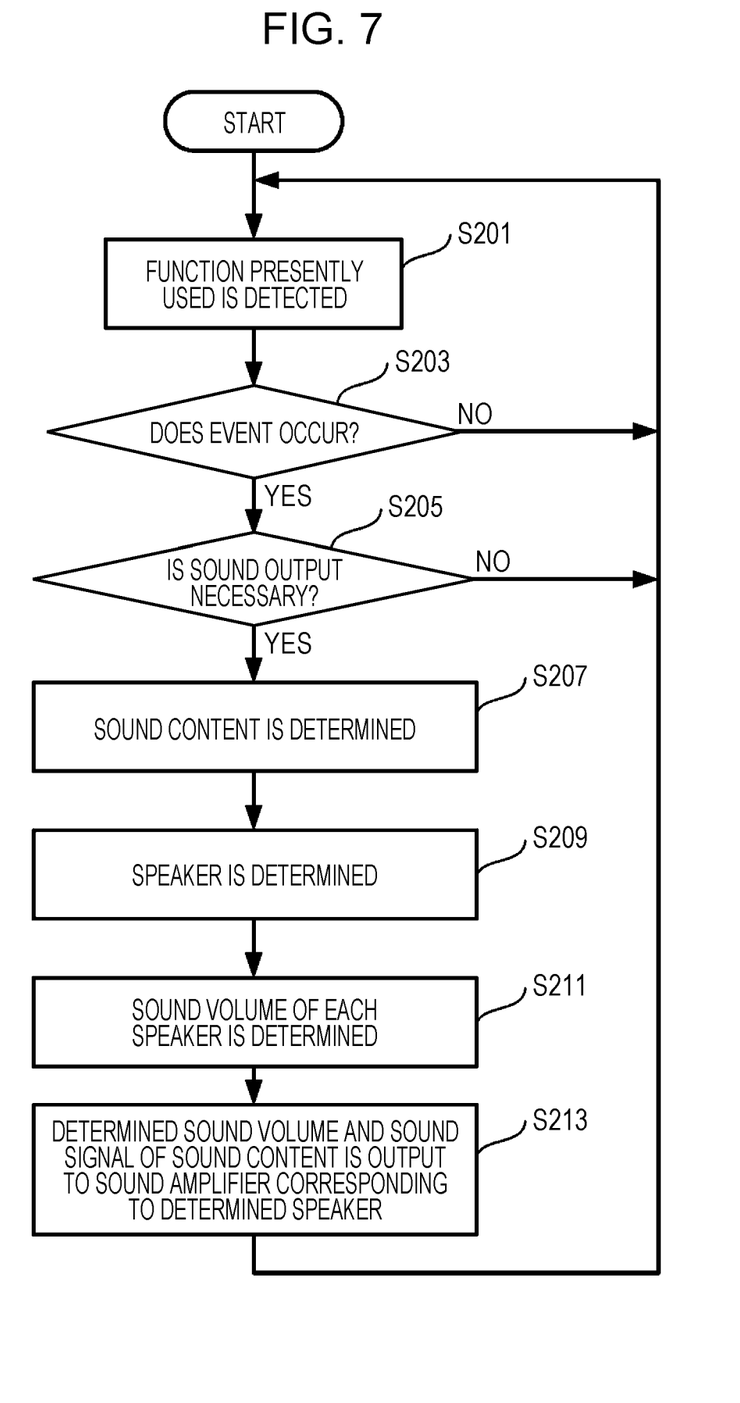
FIG. 7 is a flowchart illustrating operations of the multifunction peripheral and the finisher according to the first embodiment of the present disclosure.

Next, operations of the multifunction peripheral 800 and the finisher 900 will be described with reference to FIG. 7.

Detecting a function which is currently used (step S201) and detecting whether or not an event occurs (step S203) are continuously performed (loop in step S201 and NO in step S203).

If the event occurs (YES in step S203), whether or not the event is an event demanding the sound output is determined based on the speaker control table 400 illustrated in FIG. 5 (step S205), that is, the event which currently occurs is determined whether or not this is an event which is defined as the sound output in the speaker control table 400.

If there is no necessity of the sound output (NO in step S205), the process returns to step S201.

If there is necessity of the sound output (YES in step S205), the sound content to be output is determined with reference to the sound selection table 402 based on the function which is currently used and the event which currently occurs (step S207), a speaker to output the sound is selected with reference to the speaker control table 400 based on the function which is currently used and the event which currently occurs (step S209), the sound volume of each selected speaker is determined (step S211), and the determined sound volume and the determined sound signal of the sound content are output to the sound amplifier (881, 883, or 901) corresponding to selected speaker (step S213).

With the flow described above, a speaker is appropriately selected from the speaker P having the unidirectional property, the speaker R having the non-directional property with no directivity, and the speaker Q having the unidirectional property with the situations of the copy, the print, the scan, and the FAX reception, and the trouble such as the paper jam in the multifunction peripheral 800 and the finisher 900 as a trigger. The sound volume is appropriately set and the sound notification is performed. Therefore, it is possible to appropriately notify only demanded persons of the sound.

Second Embodiment

The speaker control table 400 may be changed based on the state of the multifunction peripheral 800, sensors included in the multifunction peripheral 800, a current usage situation and a past usage history of the multifunction peripheral 800, individual setting of the user, or the like.

For example, in a case where the finisher 900 is not installed, all the sound volumes of three speakers may be automatically set to zero. In a case where the number of speakers or the attachment position of the speaker is changed with the elimination of a plurality of finishers and paper feeding trays, the control content may be automatically changed.

In general, in a case where the plurality of finishers are connected, a distance between the discharge unit and the operation unit may be long. In this case, immediately after the user performs an operation on the operation unit, it is determined that the user is near the operation unit and the sound output of the periphery of the finisher may be turned off.

In addition, for example, since it is assumed that the user is near the periphery of the multifunction peripheral 800, the paper jam immediately after the copy operation is performed may be handled by the sound output of which the range is the vicinity of the operation unit. Since it is assumed that the user is away from the periphery of the multifunction peripheral 800, the paper jam after a while has elapsed since an operation for starting of the copy using an automatic document reading device may be handled by the sound output of which a range is from an intermediate distance to a long distance.

For example, in a case where restoration by the operation of the user is demanded, such as in a case where the paper jam, no paper, out of toner, and other specific troubles occur, first, the sound output of which the range is a short distance is performed and the notification range may be sequentially expanded to the intermediate distance and the long distance until the situation is improved. In this case, if it is detected that the user directly performs an operation on the multifunction peripheral 800, it is desirable to switch the notification to the notification of which the range is the short distance.

Third Embodiment

It is conceivable that another user C performs the print from the short distance when the user A performs the copy operation. In this case, since different users perform the operations from different positions, special processing may be performed.

For example, when the user A who performs copy setting in front of the multifunction peripheral 800 is present, in a case where the print is completed, when the sound output is performed with targeting the user C at the long distance, the sound of an excessive sound volume is output to the user A. In this case, the output of the notification sound of the print completion may be suspended until the user A complicates the operation.

In addition, also in a case where the user A performs the copy by interrupt processing during the print by the user C, it is assumed that the user A who performs the interrupt processing is in front of the multifunction peripheral 800. Therefore, the sound notification relating to the copy function may be limited to the range of the front surface operation unit. After the interrupt processing is completed, the sound notification relating to the print may be output targeting the user C.

Fourth Embodiment

Instead of the signal sounds #1 to #9 of the sound selection table 402 used in the first embodiment, a sound message #1 to a sound message #9 are used, so that the sound output from the speaker can be changed from a signal sound of the first embodiment to a sound message. Only a part thereof may be changed.

An example of the sound message is "copy is finished" in a case where the copy is normally completed and "paper jam occurs" in a case where the paper jam occurs. In a case where the facsimile is received, a name of a transmission destination of a specific address may be sound and a sound such as "facsimile is received from xx of yy company" may be output.

Fifth Embodiment

In a case where a corresponding relationship between a name of a PC, an IP address, and arrangement is held as a table and the print command is received, the selection of the directivity characteristics and the sound volume setting may be performed based on table information.

For example, levels and phases of sounds output from a plurality of speakers are adjusted, so that it is possible to adjust a sound volume and a pointing direction of a combined sound. A distance and an angle as viewed from an arrangement direction of the multifunction peripheral 800 acquired based on the arrangement direction of the multifunction peripheral 800, the position of the multifunction peripheral 800, and the position of the PC are acquired. The levels and the phases of the sounds output from the plurality of speakers may be adjusted so as to match the acquired distance and the angle.

In this case, the sound output may not be performed for a print command from a place where the sound does not clearly reach, for example, from another room or the like.

Sixth Embodiment

Speakers are installed in a plurality of rooms, the speakers are connected to the multifunction peripheral 800 via a server, and corresponding information of the rooms and the installation speakers is held in a table, so that the sound may be output from only the speaker of the room where the user who issues the print command exists. Also in this case, it goes without saying that an optimum sound notification can be performed in each room based on the speaker control table 400.

Moreover, the sound notification device described above can be realized by hardware, software, or a combination thereof. In addition, the sound notification performed by the sound notification device described above can also be realized by hardware, software, or a combination thereof. Here, being realized by software means that it is realized by a computer reading and executing a program.

The program may be stored using various types of non-transitory computer readable medium and can be supplied to a computer. The non-transitory computer readable medium includes various types of tangible storage medium. Examples of the non-transitory computer readable medium include a magnetic recording medium (for example, a flexible disk, a magnetic tape, a hard disk drive), a magneto-optical recording medium (for example, a magneto-optical disk), a CD-ROM (Read Only Memory), a CD-R, a CD-R/W, a semiconductor memory (for example, a mask ROM, a Programmable ROM (PROM), an Erasable ROM (EPROM), a flash ROM, and a Random Access Memory (RAM). In addition, the program may be supplied to the computer by various types of transitory computer readable medium. Examples of a transitory computer readable medium include an electrical signal, an optical signal, and an electromagnetic wave. The transitory computer readable medium can supply a program to a computer via a wired communication path such as a wire and an optical fiber, or a wireless communication path.

The present disclosure may be embodied in various other forms without departing from the spirit or main characteristics thereof. Therefore, each of the above-described embodiments is merely an example, and may not be interpreted restrictively. The scope of the present disclosure is indicated by the scope of the claims and is not bound in any way in the text of the specification. Furthermore, all variations and modifications falling within the scope of the claims are within the scope of the present disclosure.

The present disclosure can be used to inform a person of the situation of the device by sound.

The present disclosure contains subject matter related to that disclosed in Japanese Priority Patent Application JP 2017-109343 filed in the Japan Patent Office on Jun. 1, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A sound notification device comprising:
a finisher configured to perform post processing;
a plurality of speakers of each of which a sound volume is capable of being adjusted and which have directivity characteristics different from each other; and
a speaker control processor which selects at least one speaker of the plurality of speakers according to a content of a predetermined event and causes the selected speaker to output a sound with a sound volume and a sound content determined according to the content of the event if the event occurs in a device, wherein
the finisher comprises one of the plurality of speakers for outputting a sound related to post processing including detection of a paper jam, and
the speaker control processor selects a speaker according to a position of a notification destination assumed based on the content of the event, that is, a position obtained by setting a position of the device as a reference.

2. A sound notification device comprising:
a plurality of speakers of each of which a sound volume is capable of being adjusted and which have directivity characteristics different from each other; and
a speaker control processor which selects at least one speaker of the plurality of speakers according to a content of a predetermined event and causes the selected speaker to output a sound with a sound volume determined according to the content of the event if the event occurs in a device,
wherein the speaker control processor selects a speaker according to a position of a notification destination assumed based on the content of the event, that is, a position obtained by setting a position of the device as a reference, and
wherein the speaker control processor switches the reference of the position of the notification destination assumed based on the content of the event and the position of the device according to an event with respect to a same function of the device.

3. The sound notification device according to claim 2, wherein the speaker control processor selects a speaker according to a direction as viewed from the device of a position of a notification destination assumed based on the content of the event, that is, a position obtained by setting a position of the device as a reference.

4. The sound notification device according to claim 2, wherein the speaker control processor selects a speaker according to a distance from the device of a position of a notification destination assumed based on the content of the event, that is, a position obtained by setting a position of the device as a reference.

5. The sound notification device according to claim 2, wherein the speaker control processor selects a speaker having directivity characteristics according to a range of a position of a notification destination assumed based on the content of the event, that is, a position obtained by setting a position of the device as a reference.

6. The sound notification device according to claim 2, wherein the speaker control processor selects the number of speakers according to a range of a position of a notification destination assumed based on the content of the event, that is, a position obtained by setting a position of the device as a reference.

7. The sound notification device according to claim 2, wherein the speaker control processor causes a sound volume of the selected speaker to be changed according to a demanded reaching distance.

8. The sound notification device according to claim 7, wherein the speaker control processor switches the demanded reaching distance according to an occurrence of abnormality of the event.

9. The sound notification device according to claim 2, wherein the speaker control processor switches at least two kinds of sounds according to the content of the event.

10. The sound notification device according to claim 2, wherein the sound is a signal sound or a sound message.

11. A multifunction peripheral comprising:
the sound notification device according to claim 2.

12. A non-transitory computer readable medium storing a sound notification program comprising instructions causing a computer to function as the sound notification device according to claim 2.

13. A sound notification device comprising:
a plurality of speakers of each of which a sound volume is capable of being adjusted and which have directivity characteristics different from each other; and
a speaker control processor which selects at least one speaker of the plurality of speakers according to a content of a predetermined event and causes the selected speaker to output a sound with a sound volume determined according to the content of the event if the event occurs in a device,
wherein the speaker control processor selects a speaker according to a position of a notification destination assumed based on the content of the event, that is, a position obtained by setting a position of the device as a reference, and
wherein the speaker control processor switches the reference of the position of the notification destination assumed based on the content of the event and the position of the device according to a time with respect to a same event of a same function of the device.

14. A sound notification method of causing a plurality of speakers of each of which a sound volume is capable of being adjusted and which have directivity characteristics different from each other, to each output a sound, the method comprising:
selecting at least one speaker of the plurality of speakers according to a content of a predetermined event and a position of a notification destination assumed based on the content of the event, the position being obtained by setting a position of the device as a reference, and
causing the selected speaker to output a sound with a sound volume and a sound content determined according to the content of the event if the event occurs in a device, wherein a finisher comprises one of the plurality of speakers for outputting a sound related to post processing including detection of a paper jam.

15. A sound notification device comprising:
a plurality of speakers of each of which a sound volume is capable of being adjusted and which have directivity characteristics different from each other; and
a speaker control processor which selects at least one speaker of the plurality of speakers according to a content of a predetermined event and causes the selected speaker to output a sound with a sound volume determined according to the content of the event if the event occurs in a device, wherein
the speaker control processor is configured to select a first speaker with a unidirectional property during a copy mode or a scan mode, and to select a second speaker with a non-directional property during a print mode or a fax mode.

* * * * *